United States Patent [19]

Frijlink

[11] Patent Number: 5,056,555
[45] Date of Patent: Oct. 15, 1991

[54] DEVICE FOR PROTECTION AGAINST AN EXCESS PRESSURE

[75] Inventor: Peter Frijlink, Crosne, France

[73] Assignee: U.S. Philips Corporation, New York, N.Y.

[21] Appl. No.: 542,462

[22] Filed: Jun. 22, 1990

[30] Foreign Application Priority Data

Jun. 27, 1989 [FR] France .............................. 89 08520

[51] Int. Cl.$^5$ ........................................... F16K 17/02
[52] U.S. Cl. .................... 137/522; 137/529; 137/557; 137/907; 251/25
[58] Field of Search .............. 137/522, 528, 529, 557, 137/907; 251/25, 28, 63, 61.2

[56] References Cited

U.S. PATENT DOCUMENTS

| | | | |
|---|---|---|---|
| 2,675,204 | 4/1954 | Johnson | 251/25 |
| 3,100,083 | 8/1963 | Wardrup | 251/25 X |
| 3,344,807 | 10/1967 | Lehrer et al. | 137/557 |
| 3,422,840 | 1/1969 | Bryant et al. | 137/384 |
| 3,689,025 | 9/1972 | Kiser | 251/25 |
| 3,835,878 | 9/1974 | Braidt et al. | 137/557 X |
| 3,905,392 | 9/1975 | Gray | 137/557 |
| 4,263,935 | 4/1981 | Regnier | 137/467 |
| 4,335,744 | 6/1982 | Bey | 137/522 |
| 4,412,555 | 11/1983 | Combes | 137/524 |
| 4,598,734 | 7/1986 | Moyes | 137/557 X |
| 4,779,641 | 10/1988 | Charm et al. | 251/25 X |
| 4,794,940 | 1/1989 | Albert et al. | 251/25 X |

*Primary Examiner*—John Rivell
*Attorney, Agent, or Firm*—William Squire

[57] ABSTRACT

A first nozzle is connected to a space to be protected from excess pressure. A valve member releaseably seals the first nozzle. A second nozzle is coupled to an adjustable vacuum source for applying a predetermined vacuum level to the valve member to create a force against the member to seal the first nozzle. Seals are between the first and second nozzles and the member which couple the nozzles when the member disengages from the seals. The member disengages from the seals when the force on the member imposed by gas in the space being protected exceeds the force on the member created by the difference between ambient atmospheric pressure and the vacuum source pressure.

18 Claims, 1 Drawing Sheet

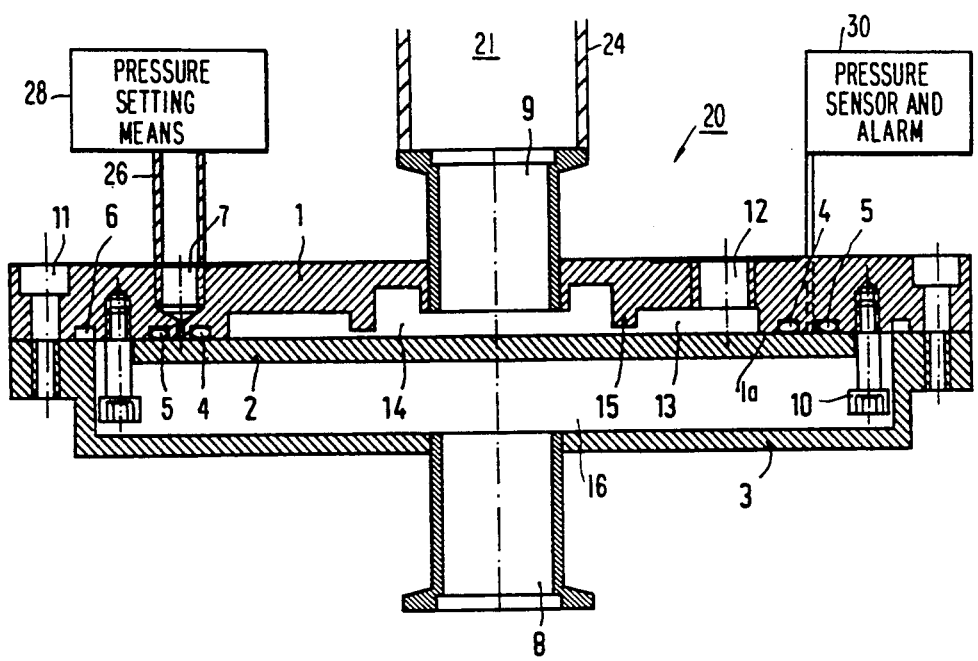

DEVICE FOR PROTECTION AGAINST AN EXCESS PRESSURE

FIELD OF THE INVENTION

The present invention relates to a device, i.e., pressure relief valve, for the protection of an apparatus against an excess pressure, which device is provided with a valve member applied by means of a given pressure relief force to a nozzle communicating with the internal space of the apparatus, the valve member being situated on the other side of the nozzle with respect to the space.

BACKGROUND OF THE INVENTION

Such a device is known, especially for gas reservoirs under pressure that could be destroyed by an excess pressure. The aforementioned given force is typically obtained by a calibrated spring.

The valve device of the present invention is intended for a system for carrying out chemical depositions from the vapour phase, especially to an epitaxy reactor. In this case, the space of the reactor is not normally subjected to high pressures, but specific problems arise. Highly toxic gases are used therein, which involves the necessity of providing a washing and purification at the outlet and solid deposits are formed therein. These deposits are susceptible to clogging the outlet gas nozzles and consequently producing an excess pressure in the reactor: such excess pressures must be absolutely avoided, even if they are very low (the limit not to be exceeded is about 0.1 bar) and even if they are of short duration. Since the gas flow rate in the reactor is about 60 to 80 liters/min and the internal volume of the reactor is about one liter, an excess pressure of 0.1 bar can be attained in one tenth of a second if the gas outlet is clogged.

A protection device for such an apparatus must therefore have the following properties:

It operates in a reliable and reproducible manner, even for low excess pressures.
Its action is very rapid.
Its switching-on pressure is adjustable.
The fact that the device has acted can be readily detected.
Its tightness is perfect and controllable.

SUMMARY OF THE INVENTION

All these properties are obtained in the device according to the invention due to the fact that the given force is a pneumatic force independent of the pressure prevailing in the space to be protected.

In an advantageous embodiment, the pneumatic force is produced due to the fact that the device comprises a second nozzle, to which the valve member is also applied, that sealing means prevent the two nozzles from communicating with each other when the valve member is applied and that the second nozzle is connected to a space at a given pressure and the sealing means are constituted by two seals, one of which surrounds the nozzle communicating with the space to be protected and the other surrounds the second nozzle.

The realization is simplified when one of the two seals entirely surrounds the other and especially when the second seal surrounds the first seal and the second nozzle merges between the two seals.

The switching-on excess pressure that can be obtained is suitable for an epitaxy reactor when the pressure of the space at a given pressure lies between zero and atmospheric pressure. This pressure is adjustable: thus, the switching-on excess pressure is itself adjustable.

The following description with reference to the sole FIGURE describing a non-limitative embodiment of the invention will make the invention clearly understood.

BRIEF DESCRIPTION OF THE DRAWING

The sole FIGURE is a sectional view through the centre of a device according to the invention made in the form of a cylinder.

DESCRIPTION OF PREFERRED EMBODIMENT

The valve device 20 could be formed from the outer wall of an apparatus to be protected. Nevertheless, in order to obtain a greater commodity of use, it is preferred to manufacture a distinct device.

This device 20 comprises a cylindrical body made of a base plate 1 and a cover 3. At the center of the base plate, a tube 9 intended to be connected to the space 21 to be protected is secured by soldering; in the present case, it is connected to the gas outlet tube 24 of the epitaxy reactor (not shown). At the center of the cover 3, a tube 8 communicating with the ambient atmosphere is, secured by soldering. The cover 3 is fixed to the base plate 1 by means of bolts 11.

The device 20 is preferably used in the position shown, in which the tube 9 faces upwards relative to gravity.

The tube 9 merges into a circular cavity 14 provided in the lower surface 1a of the base plate 1 (the internal surface of the device) surrounded by another annular cavity 13 also provided in the base plate surface 1a. The valve member 2 comprises a flat circular plate applied to these two cavities 13 and 14 at the same time. The rib 15 situated between the two cavities 13 and 14 does not touch the valve member 2 so that a narrow passage is left between the cavities when the valve member 2 is applied. The two cavities 13, 14 in communication with the space 21 to be protected constitutes what is thus far designated as "the nozzle communicating with the internal space of the apparatus".

The lower surface 1a of the base plate 1 and the outer sides of the two cavities 13, 14 are provided with two concentrical recesses each receiving a sealing means, i.e. circular seals 4 and 5, respectively. Due to the fact that it abuts these seals, the valve member 2 limits the two concentrical spaces: the seals 4 and 5 prevent a second nozzle 7 formed in plate 1 from communicating with nozzle 9 when the valve member 2 is applied against the seals 4 and 5. The internal space, i.e., Cavities 13 and 14 limited by the seal 4 comprises the nozzle communicating with the internal space of the apparatus, while between the two seals 4, 5 the valve member 2 is applied to the seals 4 and 5 to seal the second nozzle 7. The second nozzle 7 is provided with a screwthread for connecting to it a tube 26 communicating with a space at a given pressure. This space 26 is at a vacuum whose pressure is adjustable by pressure setting means 28 between atmospheric pressure and a primary vacuum. The area between the two seals 4, 5 is about equal to one tenth of that surrounded by the internal seal 4. Therefore, the vacuum between the two seals 4, 5 forces the valve member 2 to seat, while an excess pressure in the tube 9 and the spaces 13, 14 tends to remove the member 2 from its seat. The area between the two seals 4, 5 is about equal to one tenth of that surrounded by the internal seal 4 and the vacuum in the vacuum reservoir is usually fixed at half the atmospheric pressure: thus, the forces exerted by the pressure and the vacuum on each of the areas are about equal to each other when the excess pressure in the tube 9 is equal to 0.05 bar. The valve member 2 is then detached from the base plate 1 and falls under the action of its own weight; it is withheld by bolt heads 10 so that a narrow passage 16 is left between the valve member 2 and the cover 3 for the evacuation of the gas at excess pressure through the tube 8.

The function of the subdivision of the nozzle communicating with the reactor into two cavities 13, 14 is as follows: A nozzle 12 is provided with a screwthread for connecting to it a tube (not shown) connected to a gas source (not shown). Nozzle 12 communicates with the external cavity 13. Through this nozzle 12 a very small flow of a so-called sweeping gas, for example, nitrogen, is conducted, which passes between the rib 15 and the valve member 2 and then passes towards the reactor through the tube 9 so as to prevent the gas contained in the space of the reactor from penetrating into the device and from depositing contaminations therein.

In order to draw the attention of an operator operating the reactor whether an excess pressure has been produced, a pressure sensor and alarm 30 is connected to the space between seals 4 and 5. When the valve member 2 is applied, the space is limited between the two seals 4 and 5, into which space the second nozzle 7 merges. The sensor and alarm 30 is connected to this space, for example via another nozzle (not shown) identical to the nozzle 7 and situated elsewhere in the ring formed by the space between the seals 4, 5. When the valve member 2 descends, i.e., separates from seals 4 and 5, this space is opened on the outside and the vacuum condition cannot be maintained therein. This sensor makes an alarm operative.

It should be noted that the tightness of the device is ensured by the fact that, if there were a leakage via the seal 4, the gas in cavity 13 would leak away to the vacuum reservoir of the tube 26 and not to the outside. Moreover, the vacuum in this reservoir is preferably static, that is to say that after an initial pumping, the pump of means 28 is disconnected and the vacuum is maintained due to the fact that the space between the seals 4 and 5 is closed. Now, if there were a leakage via the seal 5, the vacuum would be destroyed and the system would be switched on and would consequently supply an alarm.

What is claimed:

1. A device for the protection of the internal space of an apparatus at a first pressure from excess pressure comprising:
   a first nozzle adapted to be secured to the apparatus for communicating with said internal space;
   a displaceable valve member releaseably secured to said nozzle with a given force for releaseably sealing said internal space, said member being placed in a released state in response to said excess pressure;
   pneumatic means for pneumatically applying said given force independent of the pressure in said space, said pneumatic means including a second nozzle coupled to said valve member and at a second pressure different than a third pressure for creating said given force in accordance with the difference between the second and third pressures; and
   sealing means for coupling the first and second nozzles when the valve member is in said released state and decoupling the nozzles when the valve member is secured to the nozzles.

2. A device as claimed in claim 1 wherein the sealing means comprises first and second seals, one of which seals surrounds the first nozzle communicating with the space to be protected and the other surrounds the second nozzle.

3. A device as claimed in claim 2 wherein one of the first and second seals surrounds the other entirely.

4. A device as claimed in claim 2 wherein the second seal surrounds the first seal and the second nozzle is in communication with the space between the first and second seals.

5. A device as claimed in claim 4 wherein the second pressure lies between zero and atmospheric pressure.

6. A device as claimed in claim 4 including means for adjusting the second pressure.

7. A device as claimed in claim 6 including a pressure sensor coupled to the second nozzle.

8. A device as claimed in claim 9 wherein the second pressure lies between zero and atmospheric pressure.

9. A device as claimed in claim 9 including means for adjusting the second pressure.

10. A device as claimed in claim 1 including a pressure sensor coupled to the second nozzle.

11. A device for the protection of the internal space of an apparatus at a first pressure from excess pressure comprising:
    a first nozzle adapted to be secured to the apparatus for communicating with said internal space;
    a displaceable valve member releaseably secured to said nozzle with a given force for releaseably sealing said internal space, said member being placed in a released state in response to said excess pressure; and
    pneumatic means for pneumatically applying said given force independent of the pressure in said space, said pneumatic means including a second nozzle coupled to said valve member and at a second pressure different than a third pressure for creating said given force in accordance with the difference between the second and third pressures, the second pressure lying between zero and atmospheric pressure.

12. The device of claim 11 including sealing means for coupling the first and second nozzles when the valve member is in said released state and decoupling the nozzles when the valve member is secured to the nozzles.

13. A device as claimed in claim 12 wherein the sealing means comprises first and second seals, one of which seals surrounds the first nozzle communicating with the space to be protected and the other surrounds the second nozzle.

14. A device as claimed in claim 13 wherein one of the first and second seals surrounds the other entirely.

15. A device as claimed in claim 14 including means for adjusting the second pressure.

16. A device as claimed in claim 13 wherein the second seal surrounds the first seal and the second nozzle is in communication with the space between the first and second seals.

17. A device as claimed in claim 11 including means for adjusting the second pressure.

18. A device as claimed in claim 11 including a pressure sensor coupled to the second nozzle.

* * * * *